United States Patent
Furukawa (10) Patent No.: US 9,001,236 B2
(45) Date of Patent: Apr. 7, 2015

(54) IMAGE PROCESSING APPARATUS, METHOD, AND RECORDING MEDIUM FOR EXTRACTING IMAGES FROM A COMPOSITE IMAGE FILE

(75) Inventor: Shinji Furukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 229 days.

(21) Appl. No.: 13/240,876

(22) Filed: Sep. 22, 2011

(65) Prior Publication Data

US 2012/0008013 A1 Jan. 12, 2012

Related U.S. Application Data

(63) Continuation of application No. 12/819,734, filed on Jun. 21, 2010, now Pat. No. 8,049,793, which is a continuation of application No. 10/743,082, filed on Dec. 23, 2003, now Pat. No. 7,750,953.

(30) Foreign Application Priority Data

Jan. 22, 2003 (JP) ................. 2003-013684

(51) Int. Cl.
*H04N 5/76* (2006.01)
*H04N 5/265* (2006.01)
(Continued)

(52) U.S. Cl.
CPC ................ *H04N 1/387* (2013.01); *G06T 11/00* (2013.01); *G06T 2200/32* (2013.01)

(58) Field of Classification Search
CPC ..... H04N 5/772; H04N 5/907; H04N 1/2112; H04N 5/272; H04N 2101/00; H04N 5/23293
USPC ......... 348/231.6, 231.3, 231.99, 239, 333.05, 348/714, 718, 719, 207.1; 382/284; 345/635
See application file for complete search history.

(56) References Cited

U.S. PATENT DOCUMENTS

| | | | |
|---|---|---|---|
| 5,440,401 A | 8/1995 | Parulski et al. | |
| 5,576,759 A | 11/1996 | Kawamura et al. | |
| 6,151,421 A | 11/2000 | Yamada | |

(Continued)

FOREIGN PATENT DOCUMENTS

| | | |
|---|---|---|
| FR | 2 849 511 A1 | 7/2004 |
| JP | 05-334370 | 12/1993 |

(Continued)

OTHER PUBLICATIONS

Patent abstract of JP 2001-218109, Aug. 10, 2001.
(Continued)

*Primary Examiner* — Aung S Moe
(74) *Attorney, Agent, or Firm* — Oblon, McClelland, Maier & Neustadt, L.L.P.

(57) ABSTRACT

An image processing apparatus includes an image file creation unit, a storage control unit, an extracting unit, and a display controller. The image file creation unit is configured to create a file including a plurality of images, first management information indicating a specified Exif version, and second management information including an image size and a total number of the images in the file. The storage control unit is configured to store the image file in a storage. The extraction unit is configured to extract the image from the image file in the storage based on the second management information. The display controller is configured to display the image on a display.

8 Claims, 9 Drawing Sheets

(51) Int. Cl.
*H04N 1/387* (2006.01)
*G06T 11/00* (2006.01)

(56) References Cited

U.S. PATENT DOCUMENTS

| | | | |
|---|---|---|---|
| 6,243,171 B1 | 6/2001 | Haneda | |
| 6,404,937 B1 | 6/2002 | Agata et al. | |
| 6,728,476 B1 * | 4/2004 | Haseno | 386/241 |
| 6,791,620 B1 | 9/2004 | Elswick et al. | |
| 6,831,682 B1 | 12/2004 | Silverbrook et al. | |
| 6,912,531 B1 * | 6/2005 | Matsumoto et al. | 1/1 |
| 6,920,610 B1 | 7/2005 | Lawton et al. | |
| 6,937,234 B1 | 8/2005 | Long | |
| 7,271,832 B1 * | 9/2007 | Parulski et al. | 348/231.99 |
| 7,324,135 B2 * | 1/2008 | Ouchi et al. | 348/218.1 |
| 7,676,118 B2 * | 3/2010 | Liu et al. | 382/306 |
| 2001/0040629 A1 * | 11/2001 | Miyagi et al. | 348/232 |
| 2002/0003886 A1 | 1/2002 | Hillegass et al. | |
| 2002/0048455 A1 | 4/2002 | Tamura et al. | |
| 2002/0116575 A1 * | 8/2002 | Toyomura et al. | 711/115 |
| 2002/0140827 A1 * | 10/2002 | Okisu et al. | 348/222.1 |
| 2002/0154898 A1 | 10/2002 | Hisatomi et al. | |
| 2003/0063198 A1 * | 4/2003 | Yokokawa | 348/231.2 |
| 2003/0090690 A1 | 5/2003 | Katayama et al. | |
| 2003/0098915 A1 | 5/2003 | Hyodo et al. | |
| 2003/0107654 A1 | 6/2003 | Ohmura | |
| 2003/0122940 A1 | 7/2003 | Myojo | |
| 2003/0133032 A1 * | 7/2003 | Aoki et al. | 348/333.05 |
| 2003/0147563 A1 | 8/2003 | Liu et al. | |
| 2004/0028290 A1 | 2/2004 | Gamble | |
| 2004/0130626 A1 * | 7/2004 | Ouchi et al. | 348/207.1 |
| 2004/0141069 A1 * | 7/2004 | Nakami | 348/231.6 |
| 2004/0184788 A1 | 9/2004 | Ohmura et al. | |
| 2005/0128510 A1 | 6/2005 | Campbell | |
| 2005/0240627 A1 | 10/2005 | Cohen et al. | |
| 2006/0155732 A1 * | 7/2006 | Momose et al. | 707/101 |
| 2007/0097247 A1 * | 5/2007 | Yokokawa | 348/333.1 |

FOREIGN PATENT DOCUMENTS

| | | |
|---|---|---|
| JP | 09-223155 | 8/1997 |
| JP | 10-084473 | 3/1998 |
| JP | 2002-259942 | 9/2002 |

OTHER PUBLICATIONS

Japan Electronic Industry Development Association; "Digital Still Camera Image File Format Standard Version 2.1;" Jun. 12, 1998; pp. 12, 21, 40, and 41.

* cited by examiner

IMAGE PROCESSING APPARATUS, METHOD, AND RECORDING MEDIUM FOR EXTRACTING IMAGES FROM A COMPOSITE IMAGE FILE

CROSS-REFERENCE TO RELATED APPLICATIONS

This application is a continuation of U.S. application Ser. No. 12/819,734, filed Jun. 21, 2010, which is a continuation of U.S. application Ser. No. 10/743,082, filed Dec. 23, 2003, now U.S. Pat. No. 7,750,953, issued Jul. 6, 2010. This application is based upon and claims the benefit of priority from prior Japanese Patent Application No. 2003-013684, filed Jan. 22, 2003. The entire contents of each of these documents are incorporated herein by reference.

BACKGROUND OF THE INVENTION

1. Field of the Invention

The present invention relates to an image processing apparatus, a method thereof, and a recording medium. More specifically, the present invention relates to an image processing apparatus, a method thereof, and a recording medium capable of extracting an intended small image from a single composite image comprising a plurality of small associated images, e.g., captured by a digital still camera.

2. Description of Related Art

With the spread of digital still cameras in recent years, it has been a frequent practice to connect the digital still camera to a printer via a cable or a personal computer and print captured images.

Some digital still cameras combine captured images for printing (see JP-A No. 341406/1990).

Some digital still cameras can create and record a single composite image from a series of small captured images that are associated with each other. The small images can be sequentially extracted from the recorded image data for reproduction. In this manner, there is provided a simple way of recording and reproducing motion pictures.

However, the above-mentioned composite image is printed out as a series of small images like an index print.

The composite image is displayed as a series of small images on a screen. The composite image is a single image file as data though the composite image seems to comprise a plurality of image files. Accordingly, it has been impossible to either extract or print an intended small image from the composite image created as a single image file.

SUMMARY OF THE INVENTION

The present invention has been made in consideration of the foregoing. It is therefore an object of the present invention to be able to extract an intended small image from a single composite image comprising a plurality of small associated images captured by the digital still camera.

In a first aspect of the present invention, an image processing apparatus comprises: a creation means for creating one composite image from an arrangement of a plurality of associated captured small images; a display control means for controlling display of the composite image; and an extraction means for extracting a specified small image from the composite image whose display is controlled by the display control means.

In a second aspect of the present invention, the image processing apparatus of the first aspect may further comprise a storage means for storing the composite image created by the creation means.

In a third aspect of the present invention, the image processing apparatus of the second aspect may further comprise a determination means for determining whether or not the specified small image is selected from the composite image whose display is controlled by the display control means, wherein, when the determination means determines that the specified small image is selected, the extraction means extracts data corresponding to the specified small image from the composite image stored in the storage means.

In a fourth aspect of the present invention, the image processing apparatus of the first aspect may further comprise a print instruction means for transmitting the small image extracted by the extraction means to an image print apparatus and instructing to start printing.

A fifth aspect of the present invention resides in a method of image processing which comprises the steps of: creating one composite image from an arrangement of a plurality of associated captured small images; controlling display of the composite image; and extracting a specified small image from the composite image whose display is controlled by the display control step.

A sixth aspect of the present invention resides in a program recorded on a recording medium allows a computer to perform the steps of: creating one composite image from an arrangement of a plurality of associated captured small images; controlling display of the composite image; and extracting a specified small image from the composite image whose display is controlled by the display control step.

The present invention aims at arranging a plurality of associated captured small images to create one composite image and extracting a specified small image from the composite image.

Other and further objects, features and advantages of the invention will appear more fully from the following description.

DETAILED DESCRIPTION OF THE PREFERRED EMBODIMENTS

Embodiments of the present invention will be described in further detail with reference to the accompanying drawings.

Figure 1:
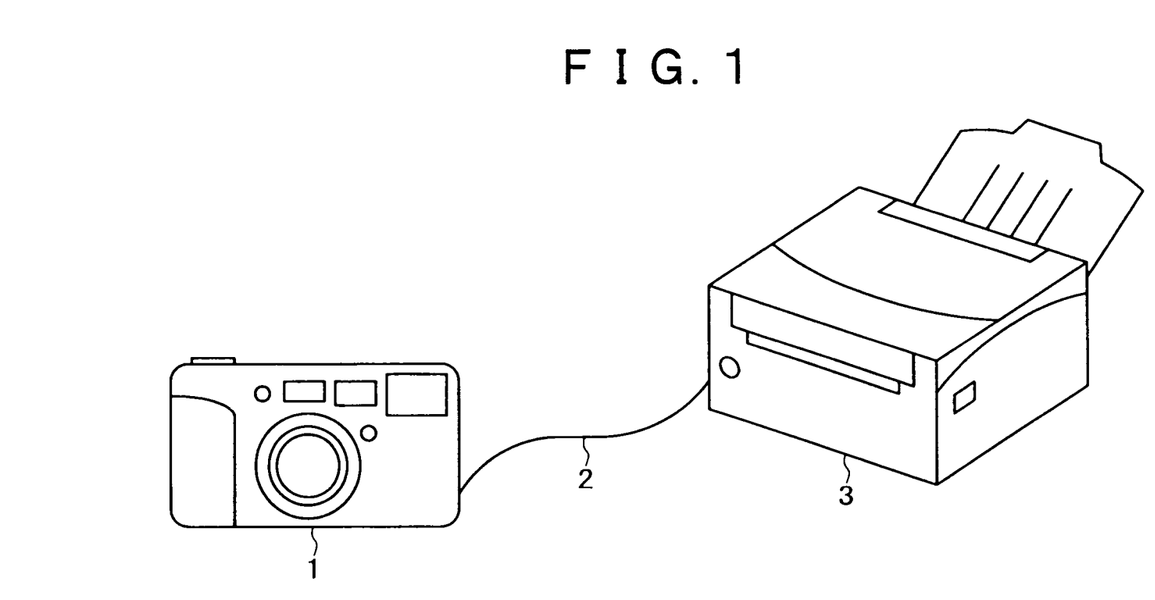
FIG. 1 shows a configuration example of an automatic print system according to the present invention.

FIG. 1 shows a configuration example of an automatic print system according to the present invention. In this system, a digital still camera 1 is connected to a printer 3 via a cable 2 compliant with IEEE (Institute of Electrical and Electronics Engineers) 1394, USB (Universal Serial Bus), and the like.

Figure 2:
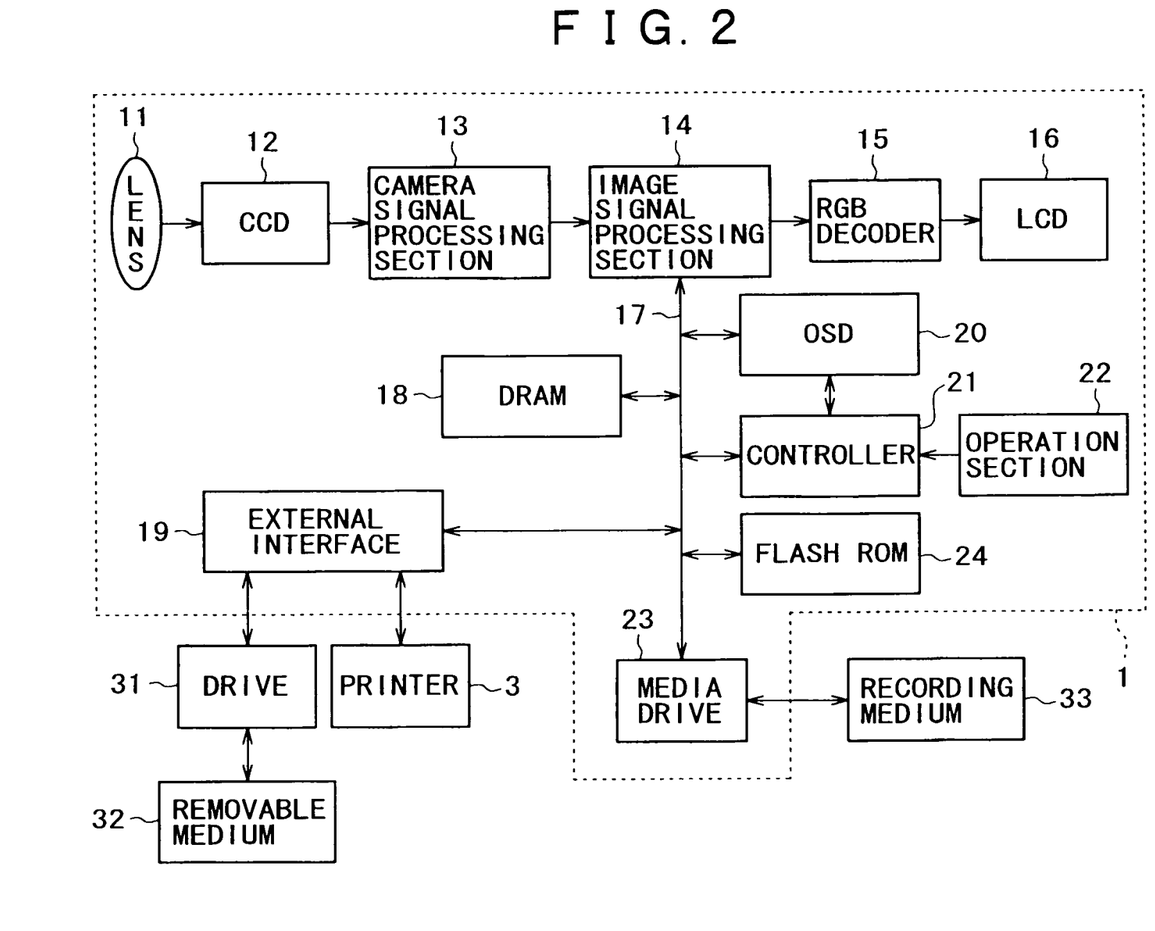
FIG. 2 shows an electrical configuration example of a digital still camera.

The digital still camera 1 captures an object, displays the object's image on an LCD (liquid crystal display) as shown in FIG. 2, and records the image as image data on a recording medium 33 (FIG. 2). The printer 3 is supplied with the image data from the digital still camera 1 via the cable 2 and prints out the image data.

When the digital still camera 1 and the printer are connected to each other via the cable 2, a negotiation is performed to check whether or not both devices have the DPS (direct print service) function. Communication becomes available when both are identified to be electronic devices having the DPS function.

The DPS standard is an application-level standard for directly connecting a digital still camera and a printer and easily providing a printout capability. The DPS standard is independent of physical interfaces or a specific transport layer and is expandable to the other transport layers.

As features of the DPS standard, a user can easily print images. In addition, the printout is available between DPS-compatible devices connected with each other independently of manufacturers and models.

It may be preferable to allow the digital still camera 1 and the printer 3 to connect and communicate with each other using not only a wired means such as the cable 2, but also so-called wireless LANs such as IEEE802.11a and IEEE802.11b and Bluetooth (registered trademark).

FIG. 2 shows an electrical configuration example of a digital still camera.

A lens block 11 supplies light (i.e., object's image) to a CCD (Charge Coupled Devices) 12. The CCD 12 converts the received light's intensity into an electrical signal and outputs it to a camera signal processing section 13.

The camera signal processing section 13 receives the electrical signal from the CCD 12, converts this signal into color difference signals Y, Cr, and Cb, and output them to an image signal processing section 14. Under control of a controller 21, the image signal processing section 14 receives the image signals from the camera signal processing section 13 and supplies them to DRAM (Dynamic Random Access Memory) 18 via a bus 17. The DRAM 18 temporarily stores the image signals. Further, the image signal processing section 14 reads the image signals from the DRAM 18, wherein the image signals are converted to an image size of an LCD 16 by the controller 21. The image signal processing section 14 superposes data input from an on-screen display (OSD) 20 on the read-out image signals and output them to an RGB decoder 15.

The RGB decoder 15 receives the image signals from the image signal processing section 14 and converts them into RGB signals, and outputs them to the LCD 16. The LCD 16 displays an image corresponding to the RGB signals supplied from the RGB decoder 15.

Under control of the controller 21, the on-screen display 20 outputs data to the image signal processing section 14 via the bus 17. At this time, the output data includes menu screens and icons comprising symbols, characters, and graphics.

The controller 21 executes various processes based on signals indicating user's instructions entered from an operation section 22. The controller 21 also controls the image signal processing section 14, the DRAM 18, an external interface 19, the on-screen display 20, and a media drive 23 via the bus 17. FLASH ROM 24 stores programs needed for the controller 21 to execute various processes.

When a shutter button is operated on the operation section 22, the controller 21 controls the image signal processing section 14 and stores a screenful of image signal in the DRAM 18. After the image signal is stored in the DRAM 18, the controller 21 compresses the image signal in an compressed format such as JPEG (Joint Photographic Experts Group). The controller 21 stores the image signal at a different address of the DRAM 18, provides a file header and the like, and streams the image signal to a JPEG file.

The compression format for image signals is not limited to JPEG. The other available formats may include TIFF (Tagged Image File Format), MPEG (Moving Picture Experts Group), and the like.

When the operation section 22 issues a command to start printing an image, the controller reads image data from the DRAM 18 and transmits the image data via the bus 17 to the printer 3 connected to the external interface 19.

The recording medium 33 comprises, e.g., semiconductor memory and contains nonvolatile memory capable of electrically writing and erasing data, making it possible to write and read various data such as images and sounds. The recording medium 33 is inserted into the media drive 23 as needed so as to permanently record data (image files) temporarily stored in the DRAM 18 or to read the saved data.

The external interface 19 comprises, e.g., a USB input/output terminal and is connected to the printer 3 for printing images. The external interface 19 is connected to a drive 31 as needed for mounting a removable medium 32 such as magnetic disk, optical disk, and magnet-optical disk. A computer program can be read from the removable media and is installed into the FLASH ROM 24 as needed.

The following describes basic operations of the digital still camera 1.

The light (object's image) supplied to the lens block 11 enters the CCD 12 and is converted into an electrical signal there. The converted electrical signal is further converted into Y, Cr, and Cb color difference signals in the camera signal processing section 13. The color difference signals travel through the image signal processing section 14 and the bus 17, and then enter the DRAM 18 to be expanded and stored temporarily.

After the image signal is temporarily stored in the DRAM 18, the controller 21 changes the image signal to such an image size as to be displayed on the LCD 16. The changed image signal is re-stored at a different address of the DRAM 18. The image signal processing section 14 reads the image signal and outputs it to the RGB decoder 15. The signal is converted into an RGB signal and then is output to the LCD 16. In this manner, the LCD 16 displays the object's realtime image, i.e., a monitoring image.

For example, a user operates the shutter button of the operation section 22 at a specified timing. In this case, the controller 21 reads an image signal temporarily stored in the DRAM 18. The controller 21 compresses the image signal using the JPEG format and then stores the compressed image signal at a different address of the DRAM 18. Further, the controller 21 provides the stored image signal with a file header and the like to stream the image signal to a JPEG file. The controller 21 reads this JPEG file and transfers it to the recording medium 33 inserted into the media drive 23 via the bus 17. The JPEG file is permanently stored in the recording medium 33.

In this manner, one image is recorded as one piece of image data on the recording medium 33.

For example, a user operates the operation section 22 to reproduce (display) an image stored in the recording medium 33. In this case, the controller transfers the image file stored in the recording medium 33 to the DRAM 18 via the bus 17. The controller 21 loads the data and decompresses the compressed file and stores it at a different address of the DRAM 18. After the decompression, the controller 21 controls the image signal processing section 14 to read the image data stored in the DRAM 18. The image signal processing section 14 superposes data input from the on-screen display 20 on the read-out image data and outputs it to the LCD 16 via the RGB decoder 15.

In this manner, image data stored in the recording medium 33 is displayed on the LCD 16.

For example, a user operates the operation section 22 to selected a feature called multiple continuous mode to continuously capture a series of images at a specified time interval. In this case, the DRAM 18 temporarily stores a series of associated captured image signals. The controller 21 reads these signals, reduces them to an intended small image size, and sequentially stores them in the DRAM 18. That image size corresponds to the predetermined number of horizontal and vertical pixels. The detail will be described with reference to FIGS. 5 and 6.

Figure 3:
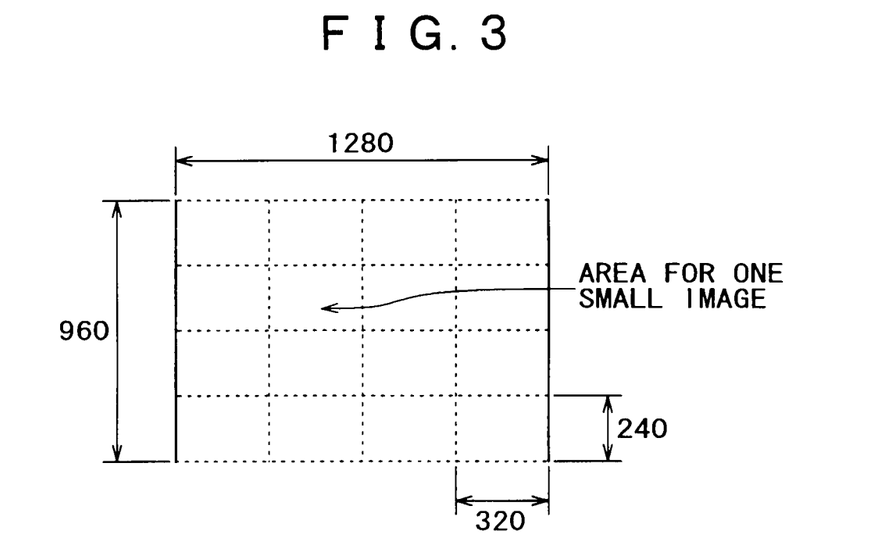
FIG. 3 shows an example of a composite image.

In this manner, as shown in FIG. 3, the DRAM 18 contains one composite image that is created from the sequentially captured image signals and comprises a plurality of orderly arranged small images. According to the example in FIG. 3, one composite image comprises 1280 horizontal pixels and 960 vertical pixels. Since there are 16 small images disposed, each small image sizes up to 320 horizontal pixels and 240 vertical pixels.

When creating the composite image, the controller 21 generates management information including information about the small image size, i.e., the number of horizontal and vertical pixels. The management information is stored in the image file header.

Figure 4:
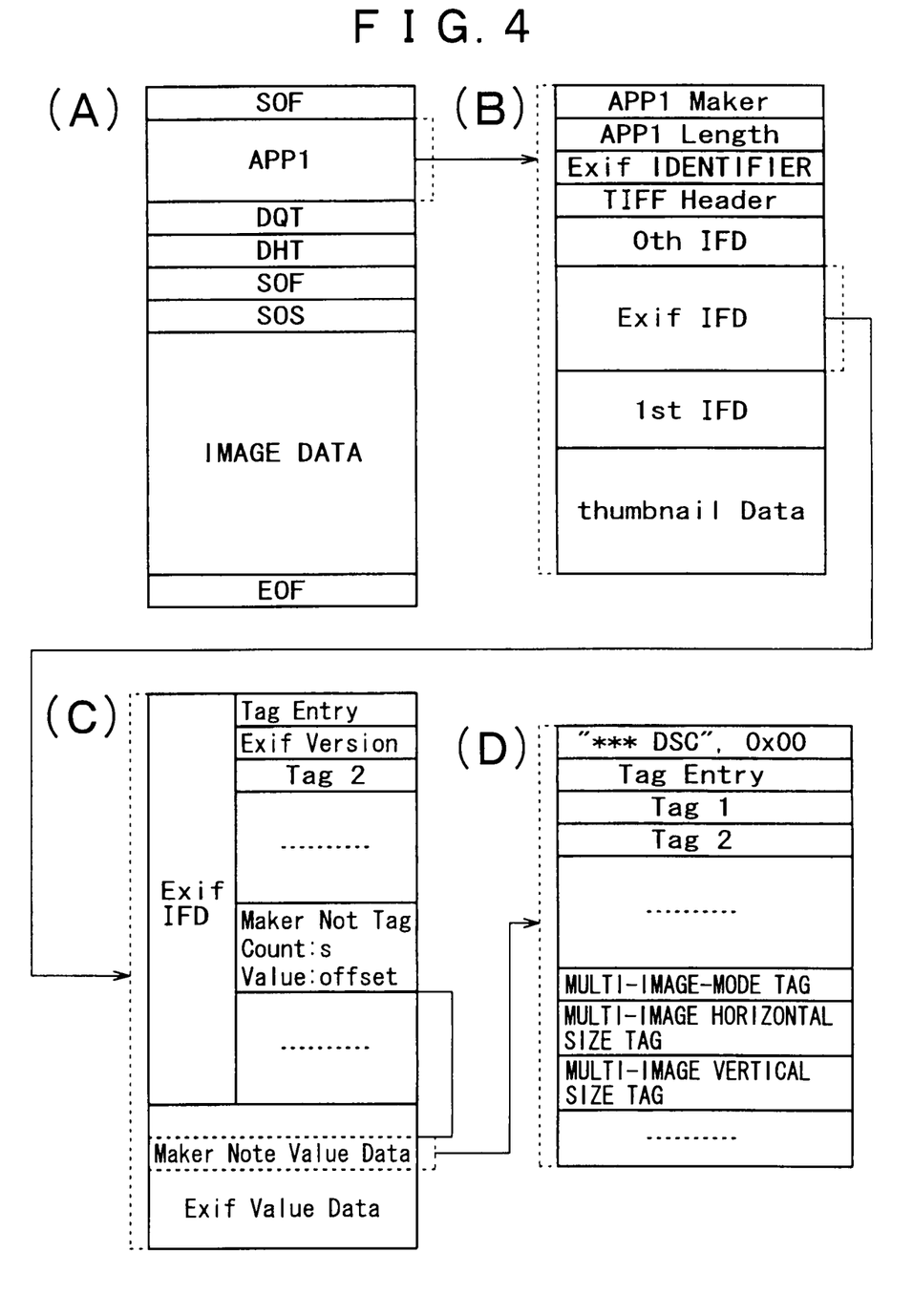
FIG. 4 diagrams an image file format.

Referring now to FIG. 4, the following describes a format for image files stored in the DRAM 18. FIG. 4 shows a predetermined image file structure called Exif (Exchange Image File) format.

FIG. 4A shows an entire structure of one image file. The image file has an SOF (start-of-frame) marker indicating the start of the image file and an EOF (end-of-frame) marker indicating the end thereof. The image data contains data for the compressed image signal to the EOF marker between the SOF and EOF markers. Any information is assigned to a header at the beginning of the image file.

FIG. 4B shows a structure of APP1, i.e., one type of information provided in the header of the image file. As shown in FIG. 4B, an APP1 marker is provided at the beginning of the APP1 information and is followed by an APP1 data length and an Exif identifier. There is also provided Exif IFD that is actual Exif data. At the end of APP1, there is provided so-called thumbnail data, i.e., a reduced version of the above-mentioned image signal.

FIG. 4C shows an Exif IFD structure. As shown in FIG. 4C, the Exif IFD begins with Tag Entry, i.e., management information indicating beginnings of a plurality of Tags. The Tag Entry information is followed by first information Tag1 indicating a specified Exif version. In addition, there are provided various types of information including Maker Note Tag. This information indicates that there is information specifically defined by a device manufacturer. The Maker Note Tag information indicates where the actual management information is descried.

The Maker Note Tag points to second management information originally provided by each device manufacturer. That is to say, the second management information is provided by specifying an address of a specified data area (Exif Value Data) in the Exif IFD structure. The second management information can have any data structure, e.g., a structure as shown in FIG. 4D to inherit the Exif IFD structure.

The second management information's data structure begins with information such as a manufacturer name, a device name, and the like. This information indicates whether or not the device can uniquely use the second management information provided by specifying the address. The information such as a manufacturer name, a device name, etc. is followed by Tag Entry, i.e., management information indicating beginnings of a plurality of Tags, and then by various management information (Tag1, Tag2, and so on).

These pieces information include: Multi-Image Mode Tag to indicate that the image data comprises a plurality of images; Multi-Image Horizontal Size Tag to indicate the number of pixels along the horizontal direction of an small image; and Multi-Image Vertical Size Tag to indicate the number of pixels along the vertical direction of an small image.

According to the specified Exif IFD structure, each Tag has a 4-byte data area. This area can be used to describe any numeric data.

In this manner, a plurality of associated small images is disposed to generate one composite image. The header of the composite image has the management information about the small images. The management information can store any information needed. This information can be used to flexibly determine the size of small images, the total number of small images to be reproduced sequentially, and the like.

Figure 5:
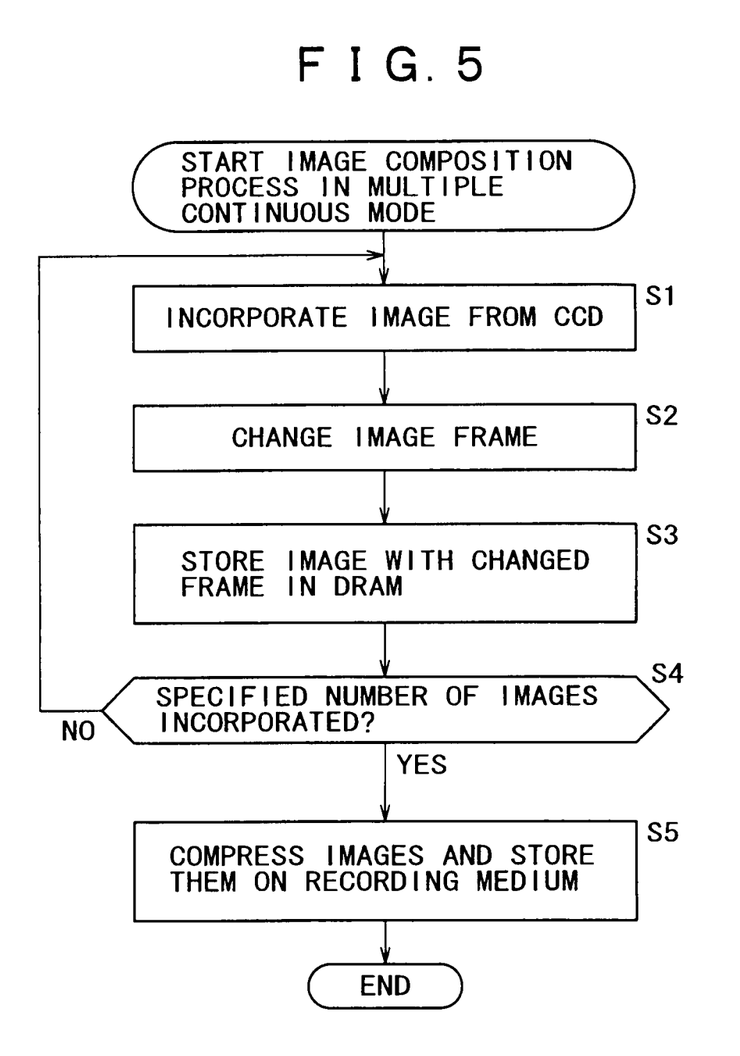
FIG. 5 is a flowchart showing an image composition process.

With reference to a flowchart in FIG. 5, the following describes an image composition process in the multiple continuous mode according to the present invention. This process starts when a user operates the operation section 22 to enable the multiple continuous mode.

At step S1, the controller 21 controls the camera signal processing section 13 to convert an electrical signal supplied from the CCD 12 into Y, Cr, and Cb color difference signals. The controller 21 then controls the image signal processing section 14 to supply the converted image signal to the DRAM 18 via the bus 17. The DRAM 18 temporarily stores the image signal.

At step S2, the controller 21 reads the image signal temporarily stored in the DRAM 18. The controller 21 then changes the frame (vertical and horizontal sizes) to an image size capable of displaying the predetermined images on the LCD 16. After the frame of the image signal is changed at step S2, the controller 21, at step S3, re-stores this image signal at a different address of the DRAM 18.

Figure 6:
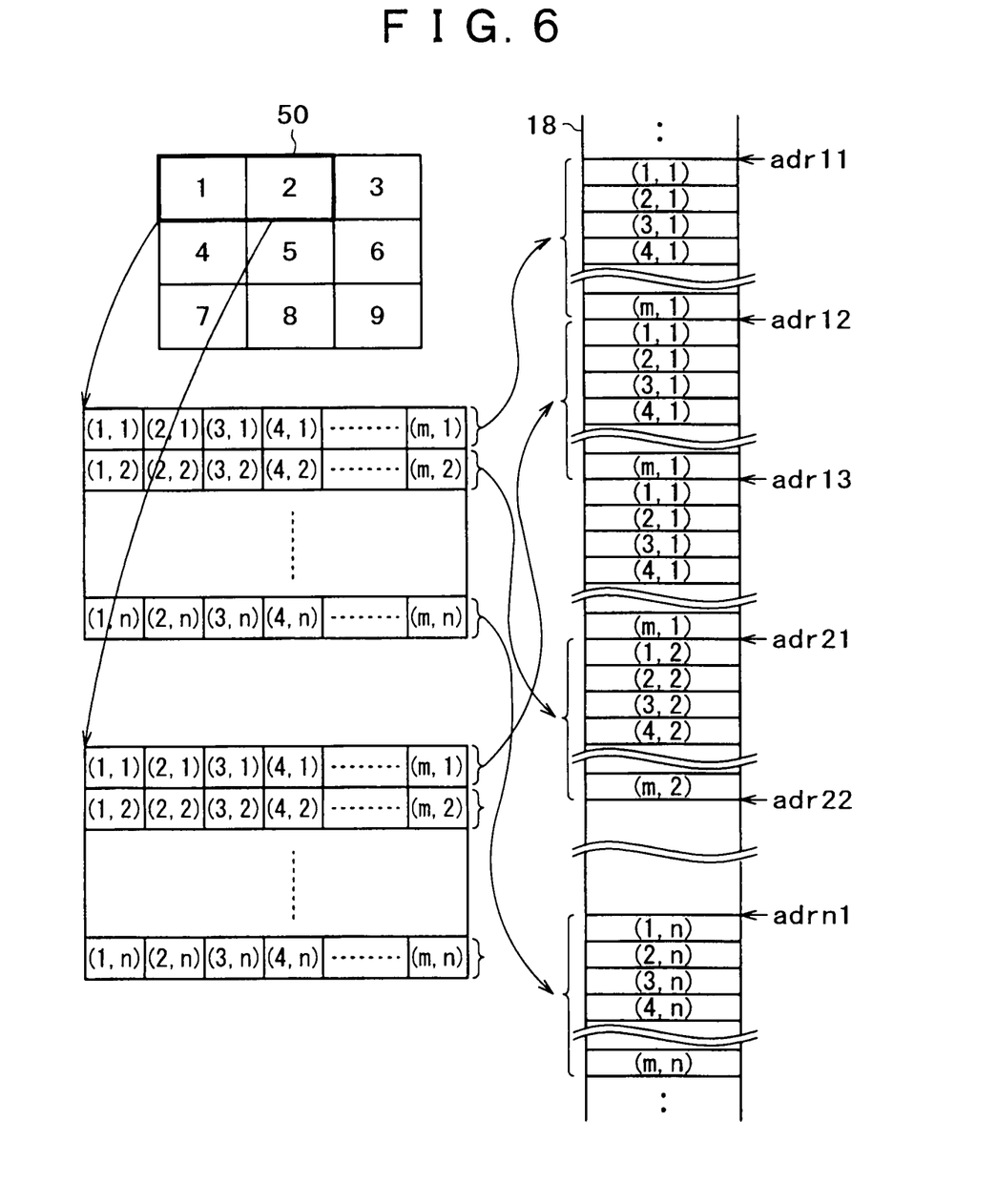
FIG. 6 schematically shows a process of storing small images.

FIG. 6 schematically shows a process of storing small images in the DRAM 18 in this case. The example shows that there are disposed nine small images, i.e., three by three vertically and horizontally. For convenience of description, the small images are numbered from 1 to 9. Pixel data for the small images are stored at specified addresses of the DRAM 18 so as to create a single composite image 50 from these nine small images. Each small image comprises m pixels horizontally and n pixels vertically. The following description uses the notation (m,n) to represent pixel data at the mth pixel horizontally and at the nth pixel vertically.

The first row of the number-1 small image contains pixel data (1,1), (2,1), . . . , and (m,1). These data are stored at address adr 11 of the DRAM 18. The second row of the number-1 small image contains pixel data (1,2), (2,2), . . . , and (m,2). These data are stored at address adr 21 of the DRAM 18. Likewise, pixel data on the third row and later in the number-1 small image are sequentially stored at the corresponding addresses of the DRAM 18. The last row of the number-1 small image is the nth row that contains pixel data (1,n), (2,n), . . . , and (m,n). These data are stored at address adr n1 of the DRAM 18.

The first row of the number-2 small image contains pixel data (1,1), (2,1), . . . , and (m,1). These data are stored at address adr 12 of the DRAM 18. Likewise, pixel data on the second to the nth rows in the number-2 small image are sequentially stored at the corresponding addresses of the DRAM 18.

This storing process is performed for the number-3 through number-9 small images.

At step S4, the controller 21 determines whether or not a specified number of images (nine images in the example of FIG. 6) are stored. When it is determined that a specified number of images are not stored yet, the controller 21 returns step S1 and repeats the above-mentioned process.

Repeating the process from steps S1 through S3 creates one composite image 50 comprising a plurality of small images (nine images in the example of FIG. 6) to be stored ion the DRAM 18.

The management information (FIG. 4D) is provided in the image file header for the composite image 50. The management information stores the small image size (the number of horizontal and vertical pixels), the total number of small images (nine in this example), and the like. The management information can be used to extract an intended image from one composite image 50 comprising a plurality of images. The detail will be described later with reference to FIGS. 7 and 8.

When it is determined at step S4 that a specified number of images are stored, the process advances to step S5. The controller 21 reads the composite image signal (the composite image 50 in the example of FIG. 6) temporarily stored in the DRAM 18. The controller 21 compresses the image signal in JPEG format, and then stores it at a different address of the DRAM 18. Further, the controller 21 provides the stored image signal with a file header and the like to stream the image signal to a JPEG file. The controller 21 reads this JPEG file and transfers it to the recording medium 33 inserted into the media drive 23 via the bus 17. The JPEG file is permanently stored in the recording medium 33.

The process at step S5 is not always performed. This process is performed when a user operates the operation section 22 to store the composite image 50 on a recording medium.

In this manner, it is possible to create one composite image comprising associated small images by streaming and storing pixel data for a plurality of the small images in the DRAM 18.

Figure 7:
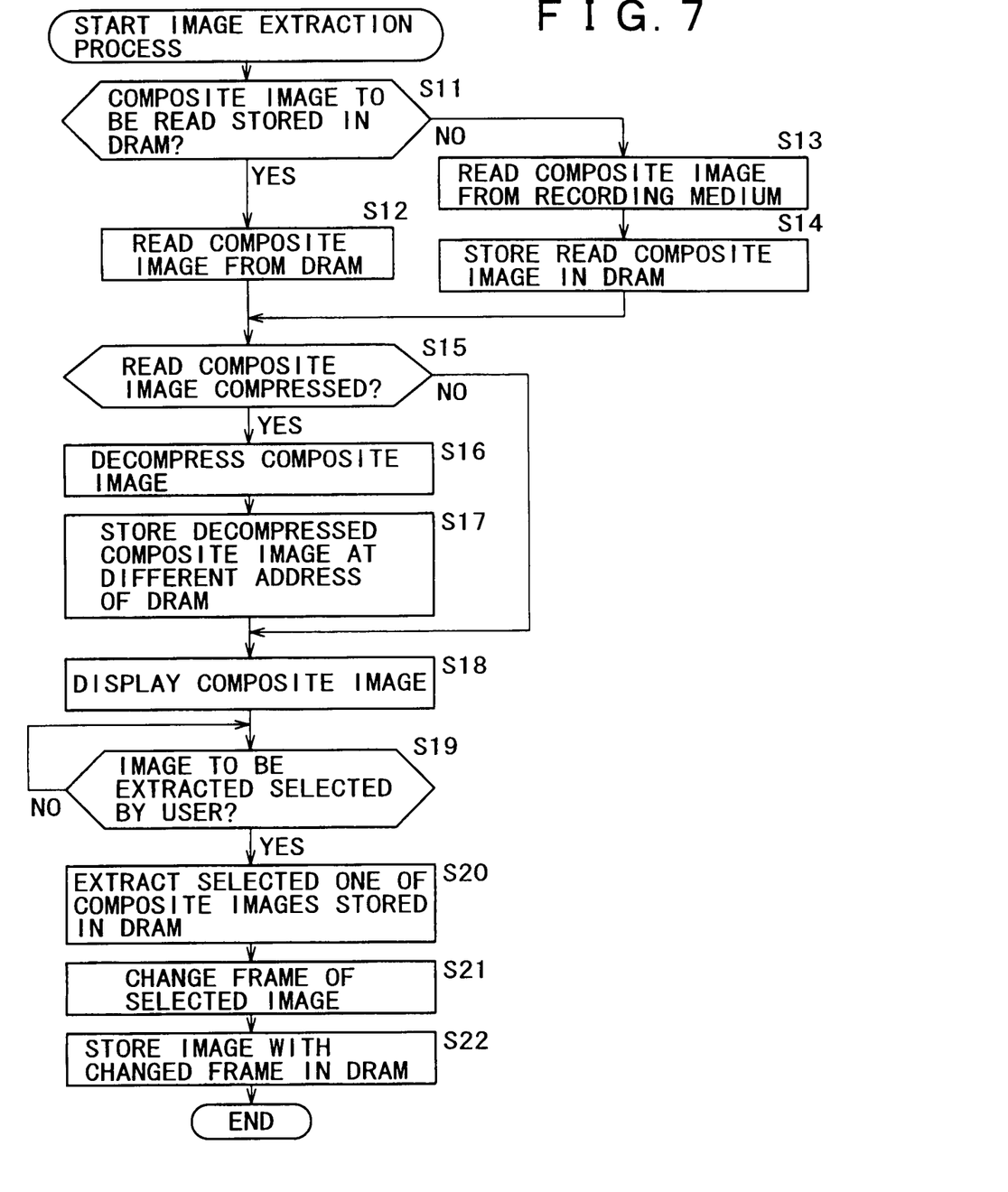
FIG. 7 is a flowchart showing a process of extracting a composite image.

Referring now to the flowchart in FIG. 7, the following describes how to extract an intended image from the composite image created by the above-mentioned image composition process. This process is performed after the image composition process in FIG. 6 or when a user operates the operation section 22 to display (reproduce) the composite image.

At step S11, the controller 21 determines whether or not the DRAM 18 stores the composite image file to be read. When it is determined that the DRAM 18 stores the composite image file, the process advances to step S12. The controller 21 reads the composite image file from the DRAM 18 via the bus 17.

When it is determined at step S11 that the composite image file to be read is not stored in the DRAM 18, i.e., in the recording medium 33, the process advances to step S13. The controller 21 reads the composite image file from the recording medium 33 via the bus 17. At step S14, the controller 21 stores the composite image file in the DRAM 18.

At step S15, the controller 21 determines whether or not the read composite image file is compressed. When it is determined that the read composite image file is compressed, the process advances to step S16. The controller 21 incorporates data from the DRAM 18 and decompresses the compressed file. At step S17, the controller 21 stores the file at a different address of the DRAM 18.

When it is determined that the read composite image file is not compressed, the process advances to step S18.

At step S18, the controller 21 controls the image signal processing section 14 to read the image file stored in the DRAM 18 and output it to the LCD 16 via the RGB decoder 15. In this manner, the LCD 16 displays the composite image 50 as shown in FIG. 6.

When the user operates the operation section 22 at step S19, the controller 21 determines whether or not the image to be extracted is selected. The controller 21 waits until the image to be extracted is selected. To select an image, for example, the LCD 16 needs to display the composite image 50 comprising an arrangement of small images. In this state, the user moves a cursor to an intended image, and then presses a decision button (not shown).

The process at step S19 is described in such a way that the subsequent process is not performed until an image to be extracted is not selected. Of course, the display of the composite image 50 may terminate without selecting any image to be extracted.

When it is determined at step S19 that the image to be extracted is selected, the process advances to step S20. The controller 21 extracts data for the selected one of small images from the composite image file stored in the DRAM 18. When an image is selected, the cursor position on the screen is used to determine the storage location of the selected small image in the DRAM 18. Pixel data for the selected small image is read from the specified address of the DRAM 18 based on the small image size (the number of horizontal and vertical pixels) stored in the management information provided for the composite image file header.

Figure 8:
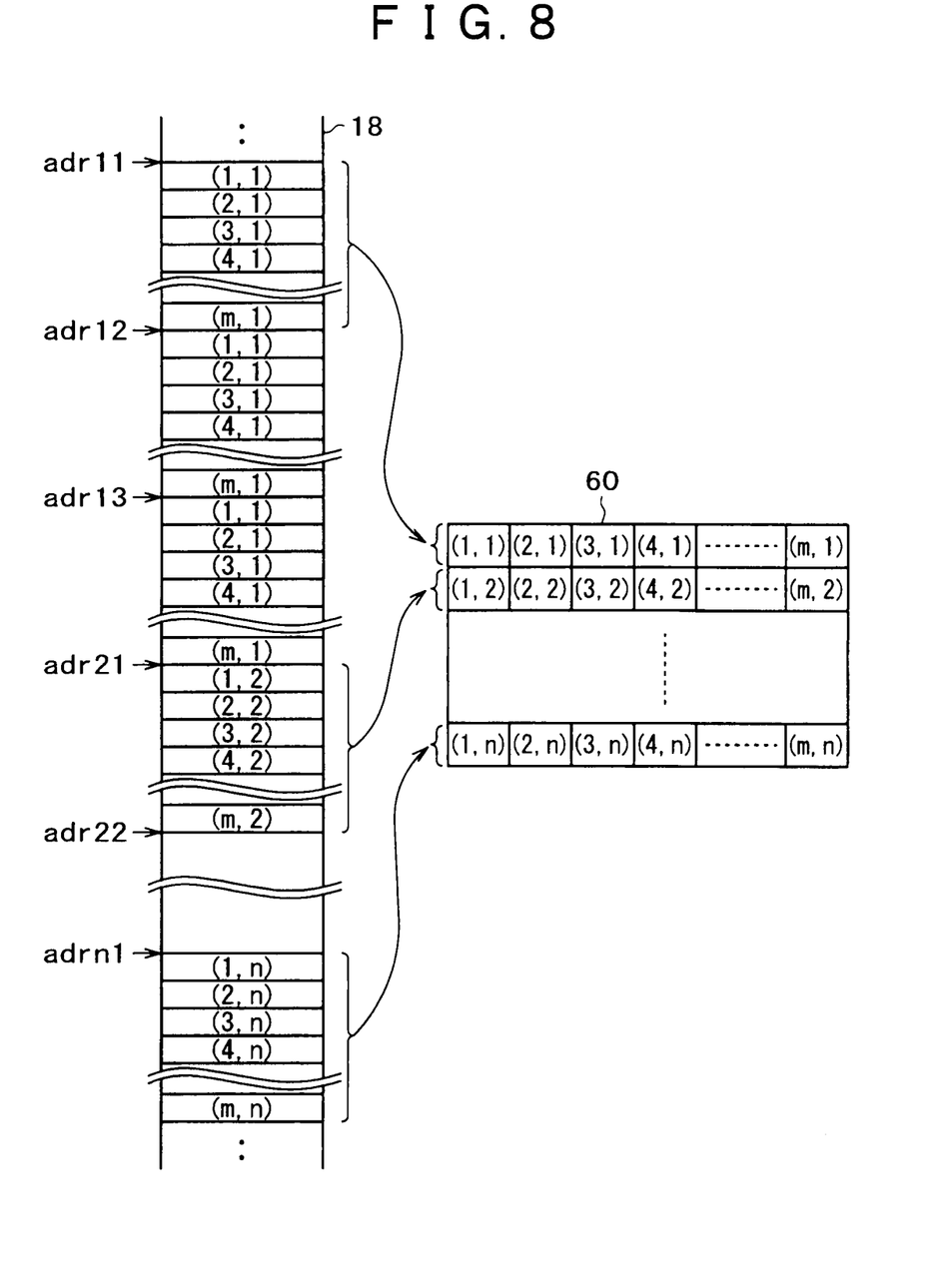
FIG. 8 schematically shows a process of extracting small images.

FIG. 8 schematically shows a process of extracting small images from the DRAM 18 in this example. The DRAM 18 stores streams of pixel data for a plurality of small images as mentioned above with reference to FIG. 6. The following describes extraction of the number-1 small image.

The first row of the number-1 small image contains pixel data (1,1), (2,1), . . . , and (m,1). These data are read from address adr 11 of the DRAM 18. The second row of the number-1 small image contains pixel data (1,2), (2,2), . . . , and (m,2). These data are read from address adr 21 of the DRAM 18. Likewise, pixel data on the third row and later in the number-1 small image are sequentially read from the corresponding addresses of the DRAM 18. The last row of the number-1 small image is the nth row that contains pixel data (1,n), (2,n), . . . , and (m,n). These data are read from address adr n1 of the DRAM 18.

It is possible to read pixel data for the intended image from the DRAM 18 by incrementing addresses and extract a small image 60.

At step S21, the controller 21 interpolates the extracted small image 60 to change the frame to a size equivalent to a full screen. At step S22, the controller 21 stores the extracted image with the changed frame in the DRAM 18. As needed, the controller 21 can read the extracted image from the DRAM 18, compress it in JPEG format. When the recording medium 33 is inserted into the media drive 23, the compressed image can be transferred to the recording medium 33 and stored there permanently.

In this manner, it is possible to extract an intended image from one composite image comprising an arrangement of associated small images.

Figure 9:
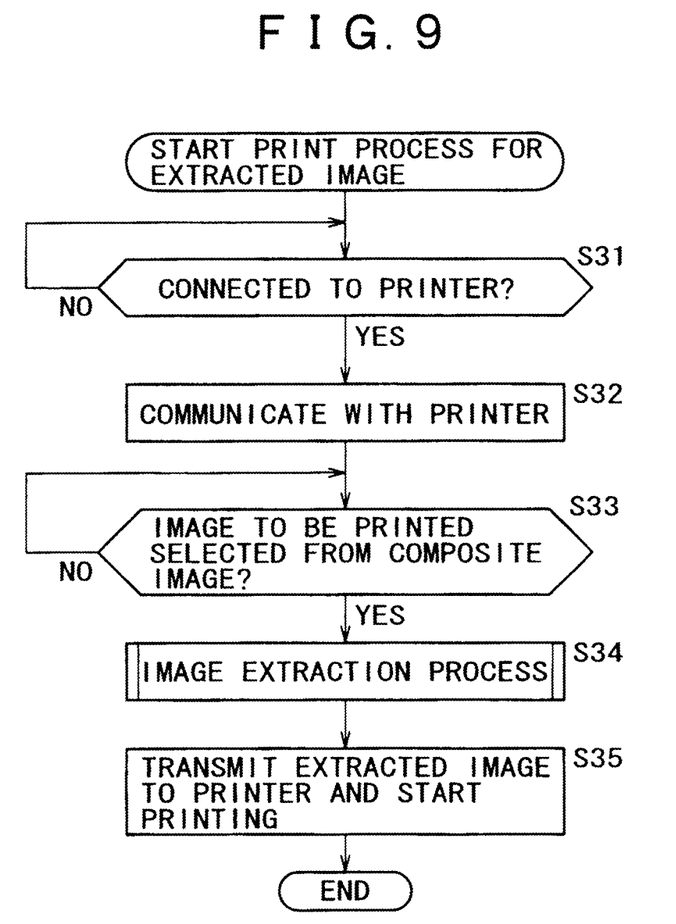
FIG. 9 is a flowchart showing a process of printing an extracted image.

The following describes a print process for extracted images with reference to the flowchart in FIG. 9.

At step S31, the controller 21 determines whether or not the external interface 19 is connected to the printer 3. The controller 21 waits until it is ensured that the external interface 19 is connected to the printer 3.

When it is determined that the external interface 19 is connected to the printer, the process advances to step S32. The controller 21 communicates with the printer 3. When the digital still camera 1 and the printer 3 both have the DPS function, for example, they can identify that both support the DPS function by exchanging the DPS definition file therebetween, i.e., by negotiating with each other. Thereafter, the controller 21 confirms the DPS service of the printer 3 and collects the printer information.

At step S33, the controller 21 determines whether or not the user operates the operation section 22 and selects an image to be printed from the composite image. The controller 21 waits until an image to be printed is selected.

When it is determined at step S33 that an image to be printed is selected, the process advances to step S34 to perform the image extraction process in FIG. 7. The process at step S34 extracts the selected image and stores it in the DRAM 18. At step S35, the controller transmits the extracted image to the printer 3 via the external interface 19 to start printing.

Conventionally, a so-called index print has been used to print a single composite image comprising a plurality of small images captured in the multiple continuous mode. The index print needs to print an arrangement of associated small images on a single sheet of print paper. As mentioned above, however, it is possible to extract an intended small image and print only that extracted image on a single sheet of print paper.

While there has been described to select one of small images from the composite image, it is obviously possible to select two or more small images.

It is possible to use the hardware or software to perform a series of the above-mentioned processes. When the software is used to perform a series of the processes, a program for the software is installed to a computer from a network or a storage medium. At this time, the computer may be installed in special hardware. Alternatively, the computer may be a general-purpose personal computer capable of performing various functions by installing various programs.

As shown in FIG. 2, the storage medium is supplied to users for providing the program independently of the apparatus. The storage medium for recording the program is available as the removable medium 32 such as magnetic disks including flexible disks, optical disks including CD-ROM (Compact Disc-Read Only Memory), DVD (Digital Versatile Disc), or magnet-optical disks including MD (Mini-Disc, registered trademark), or is available as the recording medium 33 such as semiconductor memory. In addition, the storage medium for recording the program is supplied to users as a component preinstalled in the apparatus such as the FLASH ROM 24 or a hard disk.

In this specification, the above-mentioned steps to describe a program to be recorded on the recording medium include not only processes that are performed chronologically along the specified sequence, but also processes that are performed concurrently or individually.

In this specification, the system represents the entire apparatus comprising a plurality of apparatuses.

As mentioned above, the present invention can compose images captured by a digital still camera. More particularly, the present invention can extract an intended small image from a single composite image comprising a plurality of small associated images captured by the digital still camera.

The foregoing invention has been described in terms of preferred embodiments. However, those skilled in the art will recognize that many variations of such embodiments exist. Such variations are intended to be within the scope of the present invention and the appended claims.

What is claimed is:

1. An image processing apparatus comprising:
   circuitry configured to:
   create a composite image file including
   a plurality of image files,
   first information indicating a multi-image mode tag which indicates that the composite image file includes the plurality of image files, and
   second information indicating an image size, the first information and the second information being located in a header of the composite image file, wherein
   each of the plurality of image files include rows and columns of pixel data, and
   a first row of pixel data of each of the plurality of image files are sequentially stored at distinct addresses prior to sequentially storing a second row of pixel data of each of the plurality of image files.

2. The image processing apparatus according to claim 1, wherein a first image file of the plurality of image files is located in a head portion of the composite image file.

3. The image processing apparatus according to claim 2, wherein the composite image file further includes third information indicating a recording relationship of the plurality of image files in the composite image file.

4. The image processing apparatus according to claim 3, wherein the composite image file further includes fourth information indicating a total number of the images in the composite image file.

5. The image processing apparatus according to claim 1, wherein a recording order of the first information, the second information, and first image data of a first image file of the plurality of image files is: the first information, the second information, and the first image data.

6. The image processing apparatus according to claim 1, wherein the composite image file includes a state of frame (SOF) indicating a start of the composite image file and an end of frame (EOF) marker indicating an end of the composite image file.

7. The image processing apparatus according to claim 1, wherein the image size includes the image size of each of the plurality of image files, and wherein the image size includes a number of horizontal and vertical pixels corresponding to each of the plurality of image files.

8. An image processing method comprising:
   creating, using processing circuitry, a composite image file including
   a plurality of image files,
   first information indicating a multi-image mode tag which indicates that the composite image file includes the plurality of image files, and
   second information indicating an image size, the first information and the second information being located in a header of the composite image file, wherein
   each of the plurality of image files include rows and columns of pixel data, and
   a first row of pixel data of each of the plurality of image files are sequentially stored at distinct addresses prior to sequentially storing a second row of pixel data of each of the plurality of image files.

* * * * *